United States Patent [19]

Galaj et al.

[11] 4,129,552

[45] Dec. 12, 1978

[54] INSULATION MATERIAL FOR HIGH VOLTAGE ELECTRIC POWER CABLE

[75] Inventors: Stanislas Galaj, Arcueil; Bernard Hochon, La Garenne Colombes; Pierre Lerner, Villebon sur Yvette, all of France

[73] Assignee: Compagnie General d'Electricite S.A., Paris, France

[21] Appl. No.: 772,881

[22] Filed: Feb. 28, 1977

[30] Foreign Application Priority Data

Mar. 10, 1976 [FR] France ............................ 76 06812

[51] Int. Cl.[2] ........................ C08L 23/06; C08F 6/00; C08F 110/02; C08K 5/18

[52] U.S. Cl. .................... 260/45.9 QB; 174/110 PM; 252/63; 252/63.7; 526/352.2; 528/494; 528/496

[58] Field of Search ....................... 252/63.2; 526/352; 528/494, 496; 260/45.9 QB

[56] References Cited

U.S. PATENT DOCUMENTS

| | | | |
|---|---|---|---|
| 3,088,936 | 5/1963 | Quarles et al. | 528/496 |
| 3,218,292 | 11/1965 | Horne | 260/45.9 QB |
| 3,275,715 | 9/1966 | O'Leary, Jr. | 260/45.9 QB |
| 3,627,728 | 12/1971 | Fernandes et al. | 260/45.9 QB |
| 3,629,110 | 12/1971 | Hunt | 260/45.9 QB |
| 3,669,888 | 6/1972 | Wuerstlin et al. | 260/45.9 QB |

FOREIGN PATENT DOCUMENTS

| | | | |
|---|---|---|---|
| 686579 | 1/1953 | United Kingdom | 528/496 |

*Primary Examiner*—Alan Holler
*Attorney, Agent, or Firm*—Sughrue, Rothwell, Mion, Zinn and Macpeak

[57] ABSTRACT

Low density polyethylene with a very small proportion of low molecular weight polyethylene (e.g. such as can be extracted by washing by ethanol) is used as an insulation material for high voltage power cable.

8 Claims, No Drawings

INSULATION MATERIAL FOR HIGH VOLTAGE ELECTRIC POWER CABLE

The present invention to an insulator material for high voltage electric power distribution cable.

In order to insulate electric power distribution cables operating at voltage which presently lie in the range of 20 to 225 kV, it is known to surround the central conductor of the cable with a thick covering of "low density" polyethylene. Indeed this material provides numerous advantages such as good dielectric strength, large insulation resistance, low dielectric loss, acceptable mechanical strength and deformability and it is easy to manufacture by extrusion without loss of homogeneity on cooling. Its density is generally less than 0.930. It must be distinguished from "high density" polyethylene (density greater than 0.95) which is synthesized at lower pressure and whose manufacture by extrusion at large thicknesses is more difficult and whose tendency to crack may eventually lead to electric breakdown.

Extrusion is the only method which enables the central conductor of a cable to be coated cheaply with a covering of homogenous insulator, starting from pellets of raw material. And even then it is necessary that the pellets of raw material are capable of being plasticized to form a homogenous mass at a temperature which is low enough to avoid producing breaks in the molecular chains. Here in after the term "extrudible material" is used for a material which is industrially capable of forming by extrusion a covering of at least 1cm thickness around a central conductor of 4cm diameter without cracks after coating. It is particularly important for high voltage electric power distribution that there is an extremely low risk of the appearance of faults such as bubbles or cracks since electric breakdown clearly takes place at the weakest point of the cable. This case is to be distinguished from that of telecommunications cables which are not designed to withstand high voltages but rather to have low dielectric loss. The start of a single crack in the insulator of a high power voltage distribution cable may suffice to put it out of service while such a crack would hardly effect the transmission of information in a telecommunications cable.

Further, it is easier to avoid the risks of cracks appearing in the insulation of a cable during manufacture (which risks are related to excessive viscosity) if the long chain molecules which provide the high viscosity of the material are accompanied by a sufficient proportion of short chain molecules such as polyethyl waxes or oils capable of being extracted with ethanol. Reference can be made on this subject to an article entitled "steady state melt flow behaviour of polyethylene blends" by Nobuyuki Nakajima and Patrick S. L. Wong in vol. 9, No. 1 (1965) of the transactions of the Society of Rheology at pages 3 to 11. The article shows the influence of the low molecular weight content on the viscosity of the material in the molten state.

Known materials for insulating cables for the distribution of electric power at high voltage withstand the high voltages as indicated above, with thicknesses lying between 10 to 20mm. Naturally the bulk, the weight and the cost price go up with increasing thickness of insulator material. Further, at voltages above 200Kv, an excessive thickness of insulator has an undesirable effect on the flexibility required for storing the cable on a drum and for installing it underground.

The present invention concerns the use of an insulator material for a high voltage electric power distribution cable which enables the thickness of the insulative covering to be reduced for a given voltage.

The present invention provides an insulation material for a high voltage electric power distribution cable, constituted of low density extrudible polyethylene having a density of less than 0.930 and a concentration of low molecular weight polyethylene capable of being removed by washing which is less than 600 parts per million by weight.

The present invention also provides a method of manufacturing installation material for high voltage electric power distribution cables and suitable for application to the cable by extrusion, the method comprising the use of low density polyethylene containing polyethylene of low molecular weight capable of being removed by washing at a concentration of more than 600 parts per million by weight, and so washing the polyethylene as to reduce the concentration of said low molecular weight polyethylene to less than 600 ppm by weight before application of the insulation material to cable by extrusion.

The term "washing" as used herein with regard to the extraction of low molecular weight polyethylene is explaind as follows:

The washed material is constituted by polyethylene in the form of pellets, generally known as "granules".

The solvent, which may be constituted by diethyl oxide or by ethanol for example, is so chosen that it removes only molecules of very low molecular weight.

These molecules are extracted over a period of several hours by a counter flow of the vapour of the solvent at a temperature slightly above its dew point in a flow of inert gas and shaded from light. The granules should be cooled while maintaining the same precautions (inert gas, dark).

They are then dried for several hours at reduced pressure ($10^{-2}$ to a few torr) and at a temperature which lies between 60° and 90° C. After vaccum coating the granules are stored under inert gas at ambient temperature and in the dark. Additives (eg. antioxidizers) may be incorporated before the drying phase or directly during the extrusion of the polyethylene.

PRIOR ART

The characteristics of the material conventionally used for the manufacture of high-voltage cables according to the prior art are now described:

A low density polyethylene is used:

- its density $d = 0.920$
- its content of compounds capable of being extracted by ethanol is greater than or equal to 800 ppm.
- its content of DPPD antioxydizing agent (N,N'-diphenyl-paraphenylenediamine) is 500 ppm.
- its viscosity in the molten state is such that on a brabender extrusiograph with a compression rate screw (ϕ 19mm 25D) suitable for a rate of 3 to 30 t/mm and with a temperature profile of 170°-180°-190°-210°-205° C. respectively from the hopper to the die, the couple applied to the screw is 2,500 g.m.

At a frequency of 50Hz its electrical properties are as follows:

- instantaneous dielectric strength: 77kV/mm. This strength is measured on thin extruded plates of 0.3mm thickness, with voltage applied between brass terminals in an insulating oil such as ESSO UNIVOLT 62 oil. The radius of curvature of the rounded portion of the edge of the upper electrode is 3mm. The rate of rise in voltage is 2.15 kV/s.

Endurance not greater than 38 hours in a point-plane test at 20kV using a 2mm diameter needle of 5 micron point radius, 300 angle and distance between the point and lower metal plane 10 mm.

1st MODE OF PERFORMING THE INVENTION

A first mode of performing the invention is now described. This first mode uses the same material as is used for the prior art but, before the extrusion operation, the material is washed to remove low molecular weight polyethylene under the conditions described above. A polyethylene is thus obtained whose density is practically unaltered $d = 0.920$ but which no longer contains any low molecular weight polyethylene capable of being removed by washing under the aforementioned conditions. Using the same measuring conditions as described above its viscosity is such that the couple measured on the extrusiograph is 2,800gm. Its instantaneous dielectric strength is 83 kV/mm and its endurance on a point-plane test is 48 hours on average. Clearly other types of polyethylene could be used according to the invention after washing under analogous conditions.

2nd MODE OF PERFORMING THE INVENTION

In a second mode of performing the invention, a starting material is used which is already known for constituting the insulation of telecommunications cables, since its angle of dielectric loss is less than 70 microradians at 30MHz. However, in this prior use it contained in a known manner, 600 ppm of a known antioxidizing agent of a type known by its commercial name SANTONOX-R. When used for the present invention it is preferable to use a different antioxidizing agent, and more particularly DPPD (N,N'-diphenyl-paraphenylediamine) or the like. This latter antioxidizing agent is generally used in power distribution cables because of its stabilizing effect under an applied voltage, i.e. because it partially eleminates electric discharges which could take place in possible faults inside the insulating material. It is used in a concentration lying between 200 and 2000 parts per million (ppm) by weight.

The base material used in this second mode of performing the invention is a low density polyethylene having the following characteristics (measured under the same conditions):

its density $d = 0.927$. It has only 300 ppm of polyethylene capable of being removed by washing under the above mentioned conditions. Its viscosity is such that the couple measured on the extrusiograph is 2,800 g.m. Its instantaneous dielectric strength is 93 kV/mm. Its endurance in a point-plane test is at least 64 hours. Clearly other types of polyethylene could be used according to the invention without washing. It seems that their density should preferably be above 0.925 and that their content of polyethylene capable of being removed by washing should be below 400 ppm.

In a more general manner, it has been found according to the present invention, that choosing a polyethylene having a lower content of molecules of low molecular weight than the prior art, noticeably improves the intrinsic insulation properties of the polyethylene used in power distribution cables. Correlatively it has been found, in contrast to what experts could have feared, that the insulation properties of coverings made of these new materials were not destroyed by the presence of cracks.

What we claim is:

1. Insulation material for a high voltage electric power distribution cable, consisting essentially of low density extrudible polyethylene having a density of less than 0.930 and a concentration of low molecular weight polyethylene capable of being removed by washing the polyethylene with diethyl oxide or ethanol solvent over a period of several hours by bringing the polyethylene into contact with the solvent in vapor form in counter flow at a temperature slightly above its dew point in a flow of inert gas and shaded from light which is less than 600 parts per million be weight.

2. Material according to claim 1, having a density greater than 0.925.

3. Material according to claim 1, having less than 400 parts per million by weight of low molecular weight polyethylene.

4. Material according to claim 1, with a dielectric loss angle of less than 70 microradians at 30 MHz.

5. Material according to claim 1 consisting essentially of the polyethylene an antioxidizing agent and a voltage stabilizing agent.

6. Material according to claim 5 wherein the antioxydizing agent is N,N'-diphenyl-paraphenylenediamine at a concentration lying between 200 and 2000 parts per million by weight.

7. Method of manufacturing insulation material for high voltage electric power distribution cable for application to the cable by extrusion, the method comprising the use of low density polyethylene containing polyethylene of low molecular weight capable of being removed by washing the polyethylene with diethyl oxide or ethanol solvent over a period of several hours by bringing the polyethylene into contact with the solvent in vapor form in counter flow at a temperature slightly above its dew point in a flow of inert gas and shaded from light at a concentration of more than 600 parts per million by weight, and washing the polyethylene with a solvent which only substantially removes said low molecular weight polyethylene to reduce the concentration of said low molecular weight polyethylene to less than 600 ppm by weight before application of the insulation material to the cable by extrusion.

8. Method according to claim 7, wherein the said washing is performed in a dry vapour of a solvent selected from the group consisting of ethanol and diethyloxide.

* * * * *